United States Patent [19]

Iwazawa

[11] Patent Number: 5,547,296
[45] Date of Patent: Aug. 20, 1996

[54] METHOD OF CONTROLLING A PRINTHEAD CARRIAGE VELOCITY OF A SERIAL PRINTER

[75] Inventor: Naotoshi Iwazawa, Tokyo, Japan

[73] Assignee: NEC Corporation, Tokyo, Japan

[21] Appl. No.: 248,011

[22] Filed: May 24, 1994

[30] Foreign Application Priority Data

May 24, 1993 [JP] Japan ................................. 5-121066

[51] Int. Cl.⁶ .................................................. B41J 19/30
[52] U.S. Cl. ........................... 400/322; 400/279; 388/815
[58] Field of Search ................................. 400/279, 320, 400/322, 323, 903; 318/632, 633, 634; 388/815, 907.5, 934, 805, 812, 820

[56] References Cited

U.S. PATENT DOCUMENTS

| | | | |
|---|---|---|---|
| 4,517,503 | 5/1985 | Lin et al. | 318/632 |
| 4,563,735 | 1/1986 | Hiroi | 318/632 |
| 4,567,409 | 1/1986 | Ogawa | 388/820 |
| 4,629,980 | 12/1986 | Overby | 388/815 |
| 4,675,584 | 6/1987 | Kurosawa | 318/326 |
| 4,914,726 | 4/1990 | Burke | 400/322 |
| 5,027,044 | 6/1991 | Nishimura | 318/632 |
| 5,105,138 | 4/1992 | Hiroi | 318/632 |
| 5,155,797 | 10/1992 | Nomura | 388/815 |
| 5,204,601 | 4/1993 | Hirata | 388/812 |
| 5,221,884 | 6/1993 | Teshima | 318/632 |

FOREIGN PATENT DOCUMENTS

| | | |
|---|---|---|
| 0163456 | 12/1985 | European Pat. Off. . |
| 63-277487 | 11/1988 | Japan ................................. 400/279 |
| 164669 | 6/1992 | Japan ................................. 400/279 |
| 4-164669 | 6/1992 | Japan ................................. 400/279 |

OTHER PUBLICATIONS

Patent Abstracts of Japan, vol. 8, No. 36 (E–227), Feb. 16, 1984.

Patent Abstracts of Japan, vol. 16, No. 464 (M–1316) Sep. 28, 1992.

Patent Abstracts of Japan, vol. 13, No. 106 (E–726) Mar. 14, 1989.

Primary Examiner—Stephen Funk
Assistant Examiner—Steven S. Kelley
Attorney, Agent, or Firm—Foley & Lardner

[57] ABSTRACT

A method of controlling a transportation velocity of a printhead carriage of a serial printer is disclosed. The printhead carriage is driven by a motor via a timing belt. First, a characteristic equation, which includes a motor speed, a current applied to said motor, an equivalent disturbance indicating environmental variations affecting said motor speed, is discreted. Thereafter, the equivalent disturbance is estimated using the characteristic equation which has been discreted. A value of the equivalent disturbance is determined and subsequently, a value of the equivalent disturbance compensating level is calculated using a discrete low pass filter. Finally, a current to be applied to said motor is obtained by adding a compensating level of the controller to the level of the equivalent disturbance.

5 Claims, 7 Drawing Sheets

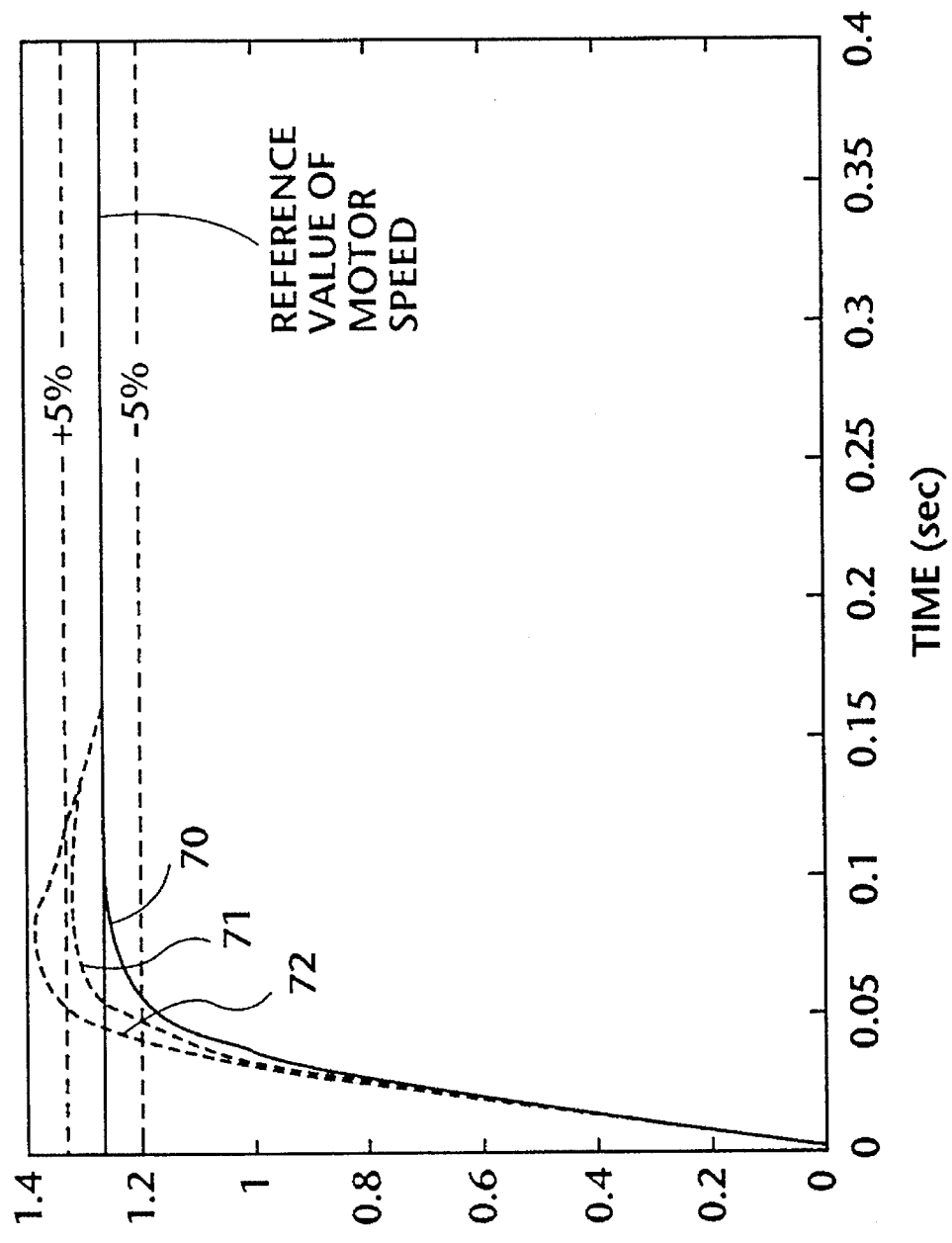

METHOD OF CONTROLLING A PRINTHEAD CARRIAGE VELOCITY OF A SERIAL PRINTER

BACKGROUND OF THE INVENTION

1. Field of the Invention

The present invention relates to a method of precisely controlling a printhead carriage transportation velocity of a serial printer irrespective of environmental changes, aging, etc. which adversely affects a speed of a motor used for driving the carriage.

2. Description of Related Art

In order to realize a high quality printing in a serial printer, it is vital to precisely control a velocity of a printhead which is driven by a motor via a timing belt.

One known approach to realizing such requirements is to constantly detect a motor speed and check to see if a motor is driven at a predetermined reference speed. That is, the motor speed detected is compared with the reference (viz., desired) speed. Thereafter, a controller provided in a feedback loop controls the motor speed such as to reduce a difference between the predetermined reference motor speed and the motor speed actually detected. Thus, the motor speed is eventually converged to the predetermined speed.

By way of example, such a prior art is disclosed in Japanese Laid-open Patent Application No. 63-277487. In this prior art, if an actual motor speed is detected faster than a predetermined value, a current to be applied to the motor is reduced. On the contrary, if the motor speed is detected lower than the predetermined speed, the motor current is increased.

However, characteristics of a motor and associated mechanism for driving a printhead, are subjected to environmental changes such as ambient temperature changes and aging of printhead driving mechanism.

As is known, serial printing is implemented by moving linearly a carriage at a constant speed. Therefore, when such environmental changes occur, the carriage speed changes and thus, print position errors are inevitably induced.

In order to overcome such problems, according to another prior art disclosed by Japanese Laid-Open Patent Application No. 4-164669, the aforesaid aging and environmental changes are used as load changes. That is, the load changes are estimated. Thereafter, a motor driving current is calculated considering the load changes which have been obtained experimentally.

The latter mentioned prior art techniques undesirably require:

(1) Load changes should previously be estimated by conducting experiments;

(2) It is required to determine time responses of a motor speed when a motor is initially energized; and (3) A memory is required which stores the experimental data.

Therefore, in order to precisely control the motor speed without incurring complicated hardware arrangment, it is highly desirable to eliminate the above mentioned problems inherent in the prior art.

SUMMARY OF THE INVENTION

It is an object of the present invention to provide a method and an apparatus for precisely controlling a speed of a motor for use in transporting a printhead carriage in a serial printer.

The above object is achieved by a method of controlling a transportation velocity of a printhead carriage of a serial printer. The printhead carriage is driven by a motor via a timing belt. First, a characteristic equation, which includes a motor speed, a current applied to said motor, an equivalent disturbance indicating environmental variations affecting said motor speed, is discreted. Thereafter, the equivalent disturbance is estimated using the characteristic equation which has been discreted. A value of the equivalent disturbance, which cancels the equivalent disturbance, is determined. Subsequently, a value of the equivalent disturbance is calculated using a discrete low pass filter. Finally, a current to be applied to said motor is obtained by adding a compensating level of the controller to the level of said equivalent disturbance.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIGS. 4A–4B, 5A–5B, 6A–6B and 7 each is a graph showing test results conducted by the inventor.

DETAILED DESCRIPTION OF THE PREFERRED EMBODIMENTS

One preferred embodiment of the present invention will be discussed in detail with reference to the accompanying drawings.

Figure 1:
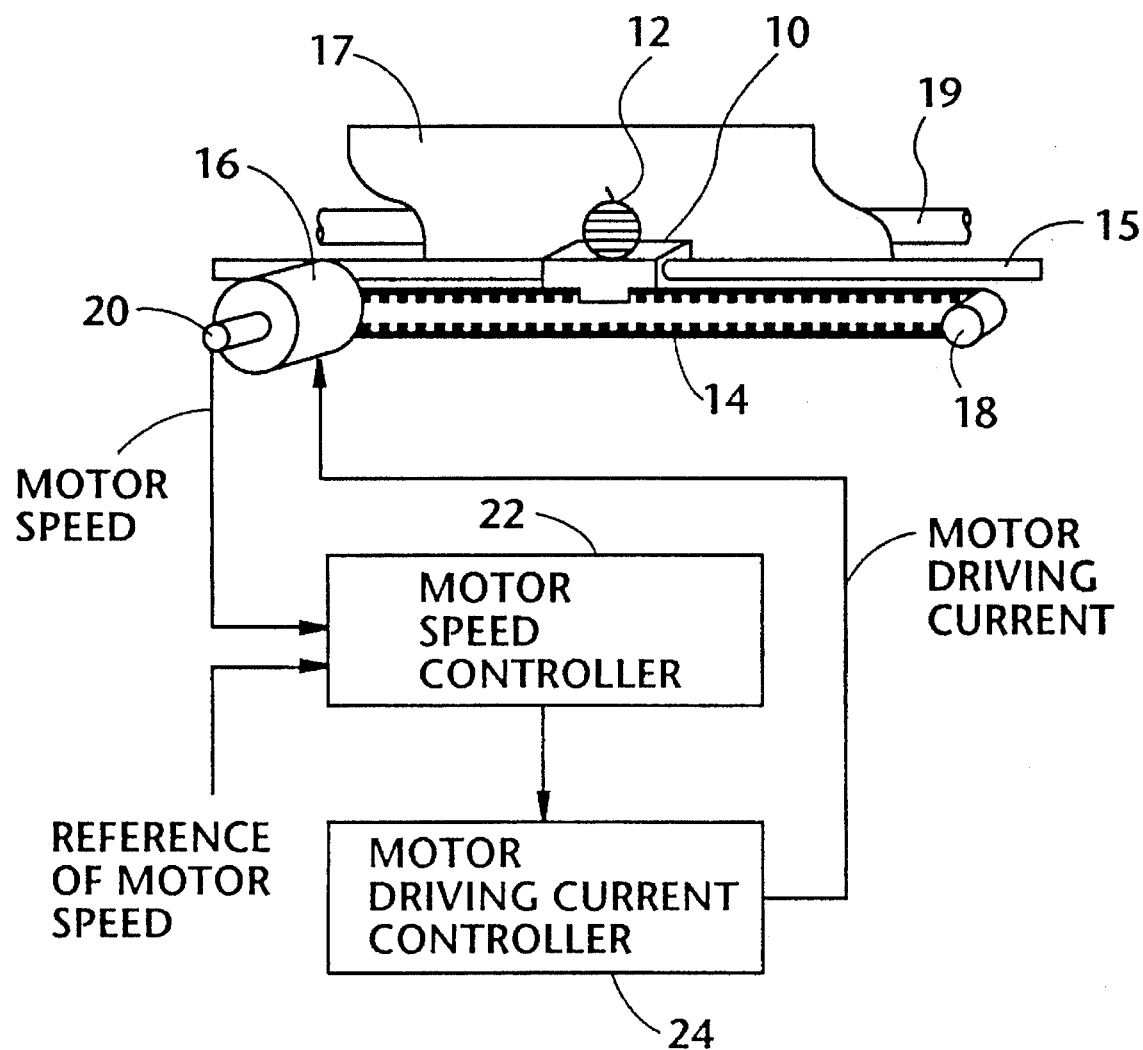
FIG. 1 is a diagram schematically showing printing mechanism of a serial printer, to which the present invention is applicable, together with functional blocks for motor speed control.

FIG. 1 is a diagram schematically showing printing mechanism of a serial printer, together with functional blocks for controlling a velocity of a printhead carriage 10.

In FIG. 1, the printhead carriage 10 is fixedly attached to a timing belt 14 and is transversely movable along a guide bar 15. The timing belt 14 is operatively coupled to an output shaft (not shown) of a DC motor 16 and an idler pulley 18. The rotational motion of the motor 16 is converted into a linear motion of the timing belt 14, whereby the carriage 10 is allowed to move transversely with respect to a platen 19. Thus, printing is implemented on a paper 17 provided between the printhead 12 and the platen 19.

The above described arrangement of driving the carriage 10 is well known in the art and therefore, further discussion thereof will be omitted merely for the sake of simplifying the instant disclosure.

The rotational speed of the motor 16 is detected using a suitable motor speed sensor 20 such as a rotary encoder, etc. The output of the sensor 20 is applied to a motor speed controller 22 whose output is then applied to a motor driving current controller 24. This controller 24 includes a DC power source although not shown in FIG. 1.

The present invention is directly concerned with the aforesaid motor speed controller 22.

Figure 2:
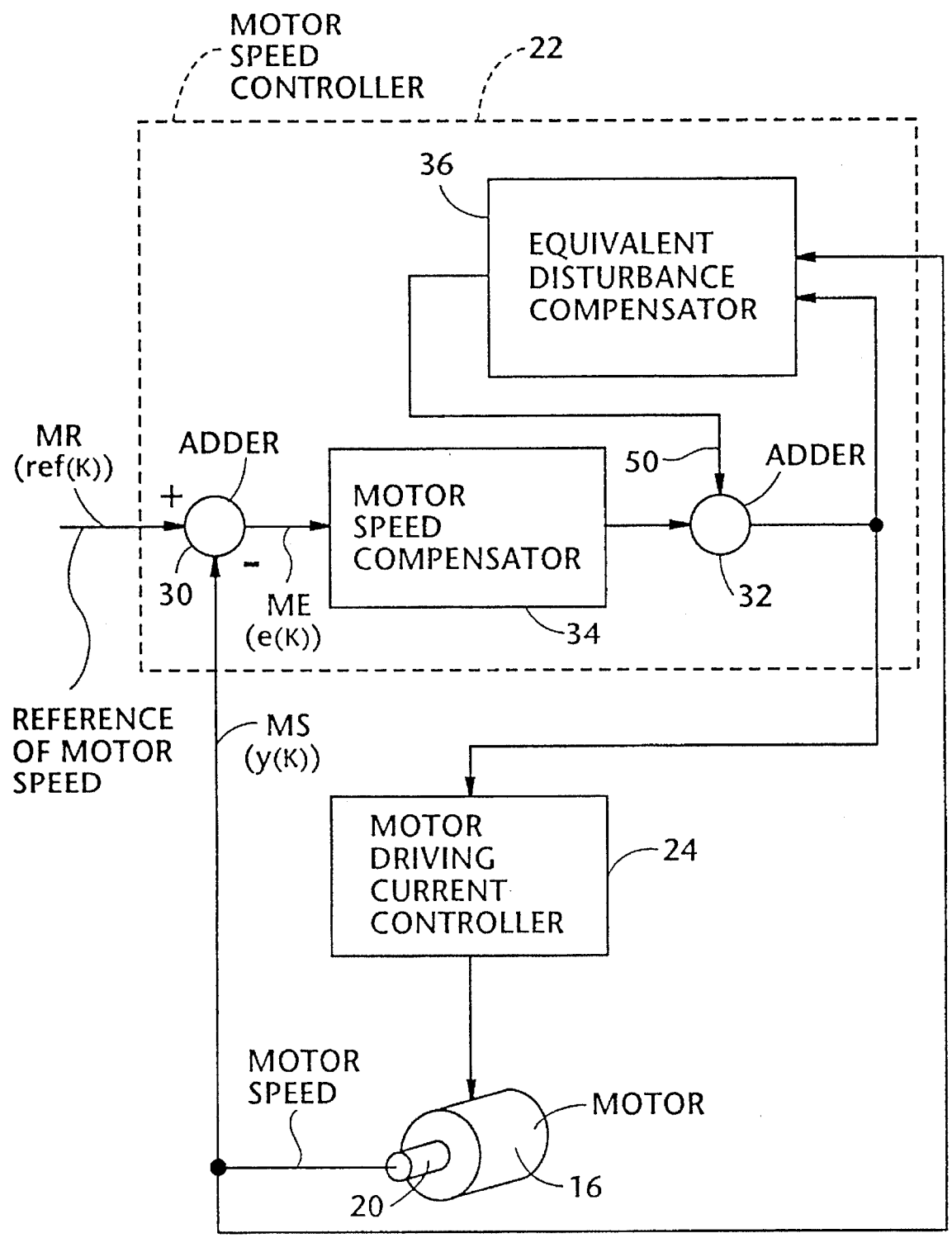
FIG. 2 is a block diagram showing functional blocks for controlling a speed of a motor shown in FIG. 1.

FIG. 2 is a block diagram illustrating in detail the motor speed controller 22 (FIG. 1) together with the motor driving current controller 24, the motor 16, and the sensor 20.

As shown in FIG. 2, the controller 22 includes two adders 30 and 32, a motor speed error compensator 34, and an equivalent disturbance compensator 36.

The adder 30 is supplied with a motor speed reference value (depicted by MR) and a motor speed MS detected by the motor speed detector 20. The adder 30 outputs a motor speed error signal ME, which corresponds to a difference between the signals MR and MS. The error signal ME is applied to the motor speed compensator 34.

The compensator 34 is realized or configured using the following algorithm which can be represented by the following equation (1) wherein u(k) indicates the output of the compensator 34.

$$u(k) = Kp \cdot e(k) + K_I e_s(k) \qquad (1)$$

where (a) $e(k) = \text{ref}(k) - y(k)$, (b) $e_s(k) = \sum_{m=0}^{k} e(m)$, (c) e(k) corresponds to the error signal ME, (d) ref(k) corresponds to the signal MR, (e) y(k) corresponds to the signal MS, and (f) Kp and $K_I$ each is a coefficient.

The equivalent disturbance compensator 36 first estimates an equivalent disturbance and then generates a compensating signal 50 which compensates for the equivalent disturbance. The signal 50 is applied to the adder 32.

The following equations (2)–(6) are used for configuring the hardware arrangement of the equivalent disturbance compensator 36.

(a) Elastic forces exerted on the timing belt 14:

$$T1 = k_1(r\theta_1 - x)$$
$$T2 = k_2(x - r\theta_2)$$
$$T3 = k_3(r\theta_2 - r\theta_1) \qquad (2)$$

(b) Torque equilibrium equation at the axis of the motor 16:

$$K_t \cdot i = J1(d^2\theta_1/dt^2) + Cm(d\theta_1/dt) + rT1 - rT3 \qquad (3)$$

(c) Torque equilibrium equation at the axis of the idler pulley 18:

$$0 = J2(d^2\theta_2/dt^2) + rT3 - rT2 \qquad (4)$$

(d) Force equilibrium equation at the carriage 10:

$$0 = M(d^2x/dt^2) + Cc(dx/dt) + T2 - T1 \qquad (5)$$

(e) Voltage equation of the motor 16:

$$e = L(di/dt) + Ri + K_A(d\theta_1/dt) \qquad (6)$$

where $J_1$: motor inertia moment, $J_2$: idler pulley inertia moment,

T1: belt elastic force between the motor 16 and the carriage 10,

T2: belt elastic force between the carriage 10 and the pulley 18,

T3: belt elastic force between the motor 16 and the pulley 18, $k_1, k_2, k_3$: belt elasticity coefficient, spring constant of a belt, M: weight of the carriage 10, Cc: carriage viscous damping, Cm: motor viscous damping, R: electric resistance of motor coil, L: inductance of motor coil, $K_t$: motor torque coefficient, $K_A$: coefficient of inductive counter electromotive force, r: radius of the pulley 18, e: motor driving voltage, i: motor driving current, x: carriage position, $\theta_1$: rotated angle of the motor's axis, and $\theta_2$: rotated angle of the pulley' axis.

A simplified model is derived from the above equations (2)–(6). It is assumed that an electric time constant is sufficiently small as compared with a mechanical time constant (viz., L/R=0). Thus, we obtain $$e = R \cdot i + K_A \cdot \dot{\theta}_1 \qquad (7)$$

If T2=T3=0 in equations (2)–(5), then $$K_t \cdot i = J_1 \cdot \ddot{\theta}_1 + Cm \cdot \dot{\theta}_1 + r\,(M[|\$]\$\ddot{g}\ddot{v}x + Cc\dot{x}) \qquad (8)$$

Further, if it is assumed that the timing belt 14 has no rigidity (viz., $x = r\theta_1$), equation (8) is rewritten as follows.

$$K_t \cdot i = (J1 + r^2 M)\ddot{\theta}_1 + (Cm + Cc)\dot{\theta}_1 \qquad (9)$$

Subsequently, the following substitution of variables are performed.

$$J_E = J1 + r^2 M$$
$$C_E = Cm + Cc$$

wherein $J_E$ indicates equivalent inertia, and $C_E$ indicates equivalent viscosity. p Using equation (6) and $\omega = \dot{\theta}_1$, equations (9) and the motor 16 can be simplified as follows.

$$K_t \cdot i = J_E \dot{\omega} + C_E \omega$$
$$e = R \cdot i + K_A \omega \qquad (10)$$

A state equation in connection with the motor 16, including the equivalent d, is given by $$\dot{x} = \beta x + \alpha u + d \qquad (11)$$

where $$\alpha = K_t/(J_E \cdot R)$$
$$\beta = (K_t \cdot K_A + C_E \cdot R)/(J_E \cdot R) \qquad (12)$$

If these equation are discreted with respect to sampling time at the controller, the following equation is given $$zx_d = \beta_d x_d + \alpha_d u + d \qquad (13)$$

where z is a Z transform operation, a component with suffix "d" implies a discreted component. Thus, the disturbance can be canceled.

An equivalent disturbance compensating value $U_r(z)$ is obtained by multiplying $D(z)$, which is given below, by a discrete low pass filter $(1-p)/(z-p)$.

$$D(z) = -(d/\alpha_d) = (\beta/\alpha)x_d + u - (1/\alpha)x_d \quad (14)$$

That is, $$U_r(z) = H(z) \cdot D(z) = \{(1-p)/(z-p)\}\{(\beta/\alpha)x_d + u - (1/\alpha)x_d\} \quad (15)$$

The value $U_r(z)$ is transformed into the following recurrence formulas.

$$x_r(k+1) = (1-p)\{(\beta/\alpha)x_d(k) + u(k)\} + px_r(k)$$

$$u_r(k) = -\{(1-p)/\alpha\}x_d(k) + x_r(k)\} \quad (16)$$

Figure 3:
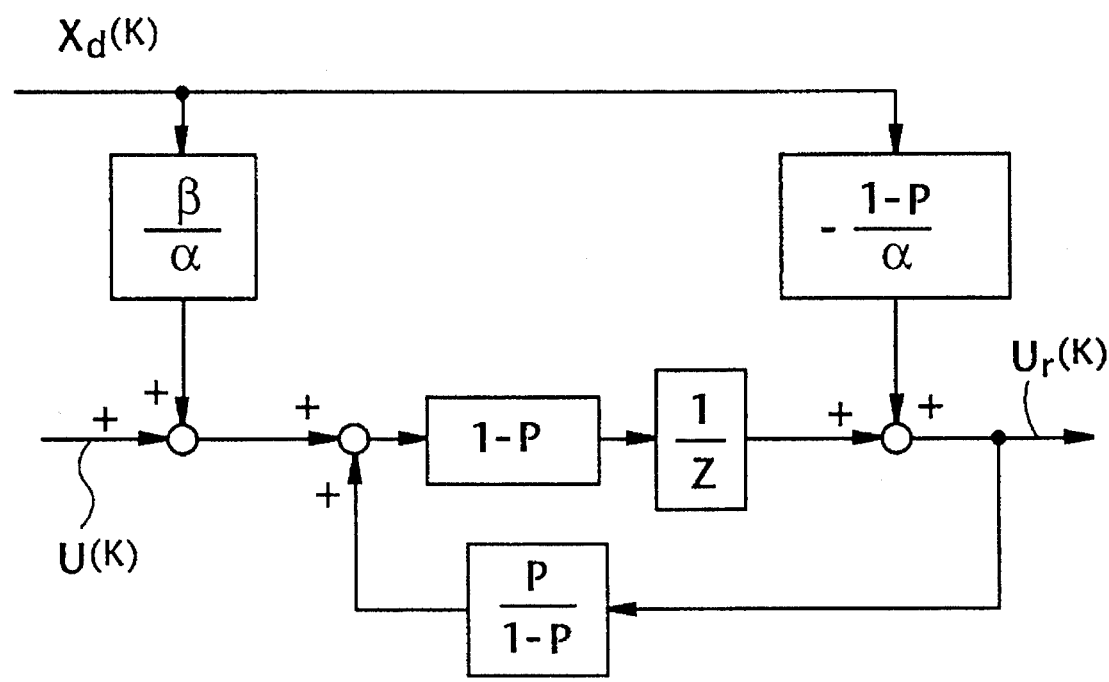
FIG. 3 is a block diagram illustrating control functions derived by a control equation described in the instant disclosure.

FIG. 3 is a diagram expressing equation (16) in block diagram form.

In the event that the equivalent disturbance compensation is performed, transmission characteristics of the compensating value, depicted by $Y(z)$, is given by $$Y(z) = W_{RYd} \cdot R(z) + W_{DYd} \cdot (1 - G_{Ld}) \cdot D(z) \quad (17)$$

wherein $R(z)$ is a desired motor speed, and $D(z)$ is an equivalent disturbance.

On the other hand, if the equivalent disturbance compensation is not implemented, then $$Y(z) = W_{RYd} \cdot R(z) + W_{DYd} \cdot D(z) \quad (18)$$

Figure 4A:
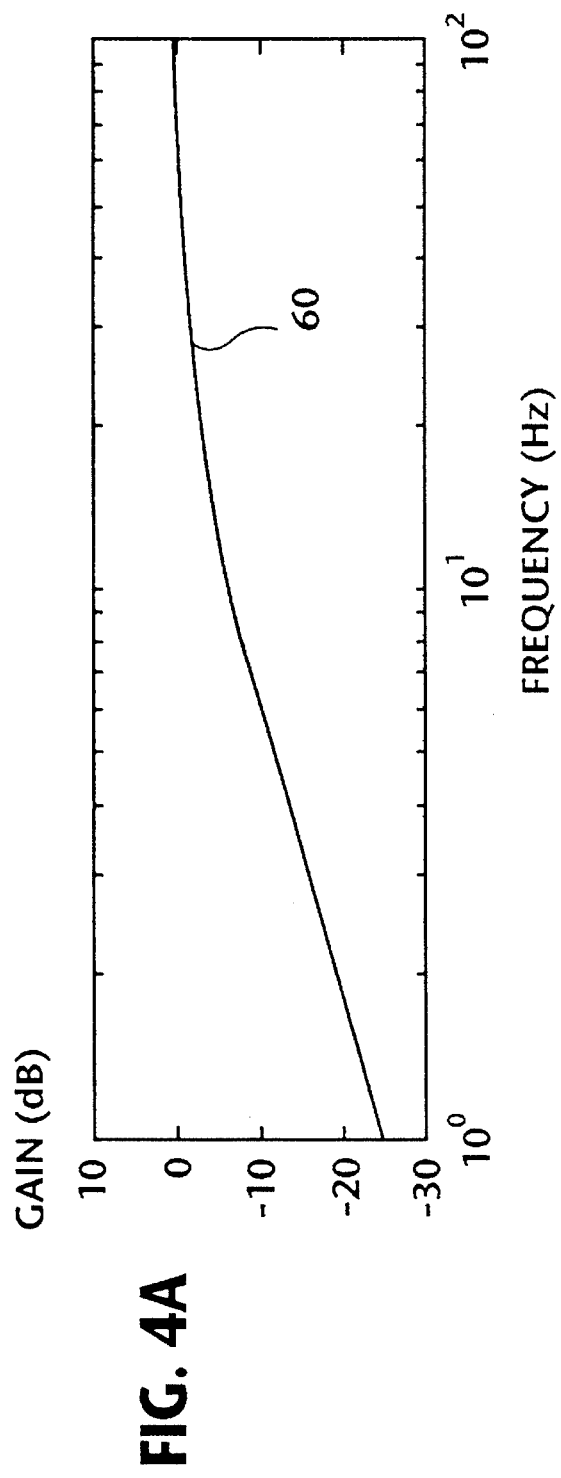
Figure 4B:
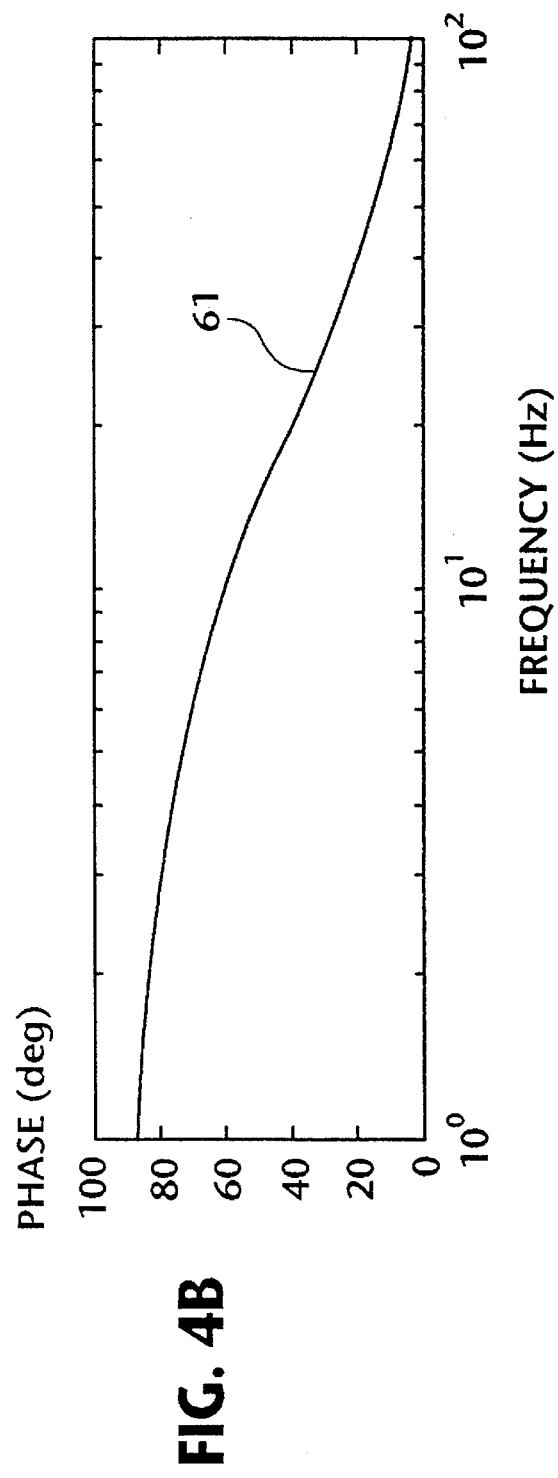

FIGS. 4A and 4B each is a graph showing the result of frequency response of $(1-G_{Ld})$. That is, a curve 60 indicates a gain of $(1-G_{Ld})$ (FIG. 4A), while a curve 61 indicates a phase of $(1-G_{Ld})$ (FIG. 4B). It is readily appreciated from FIGS. 4A and 4B that the equivalent disturbance $D(z)$ can effectively be suppressed in a low frequency region.

Figure 5A:
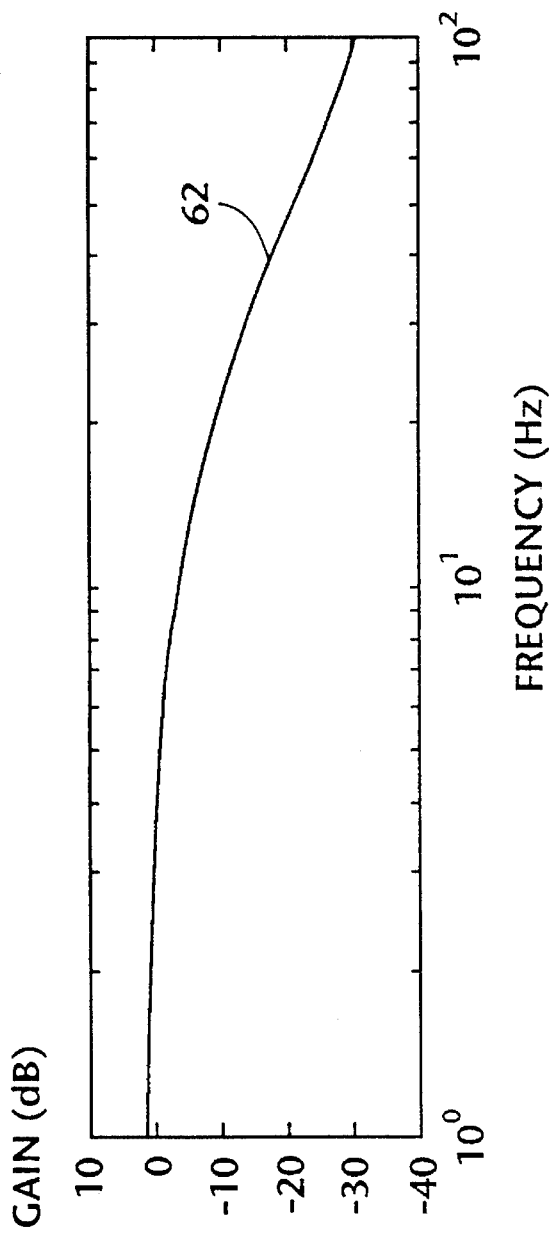
Figure 5B:
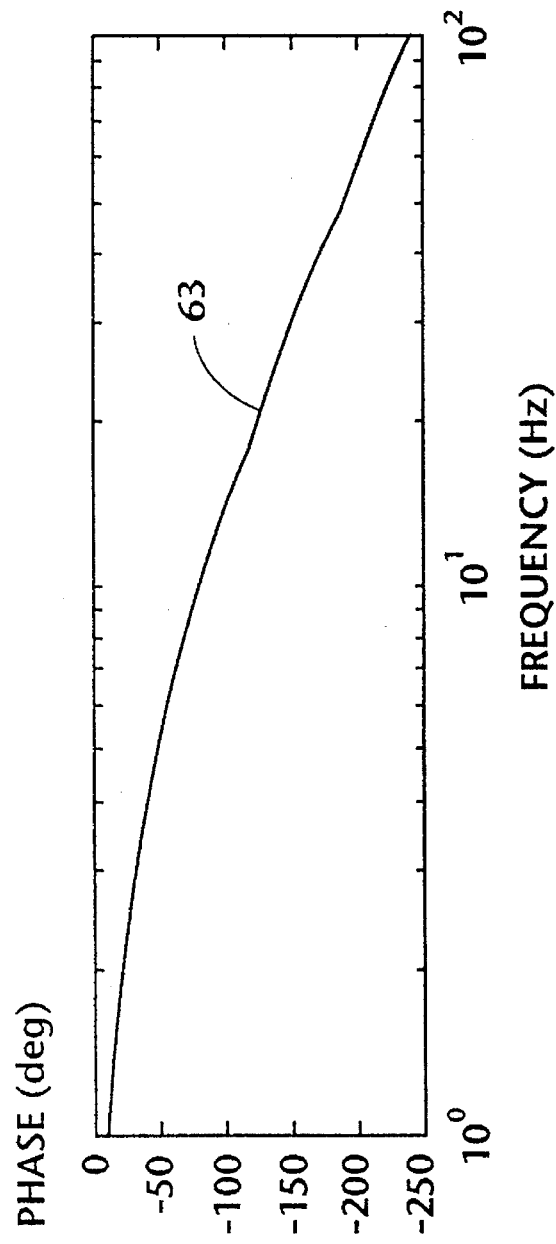

Further, each of FIGS. 5A and 5B is a graph showing a frequency response from the desired motor speed R up to the control value Y. A curve 62 indicates frequency response of gain (FIG. 5A), while a curve 63 indicates a phase versus frequency. In this case, there exist no changes in frequency response irrespective of whether or not the compensation is implemented.

Figure 6A:
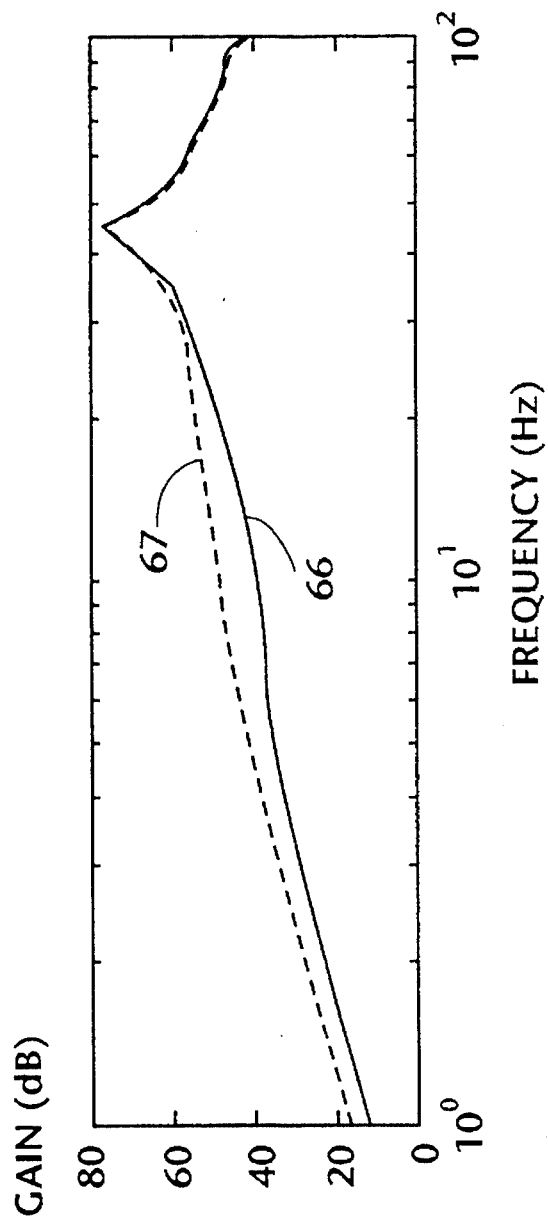
Figure 6B:
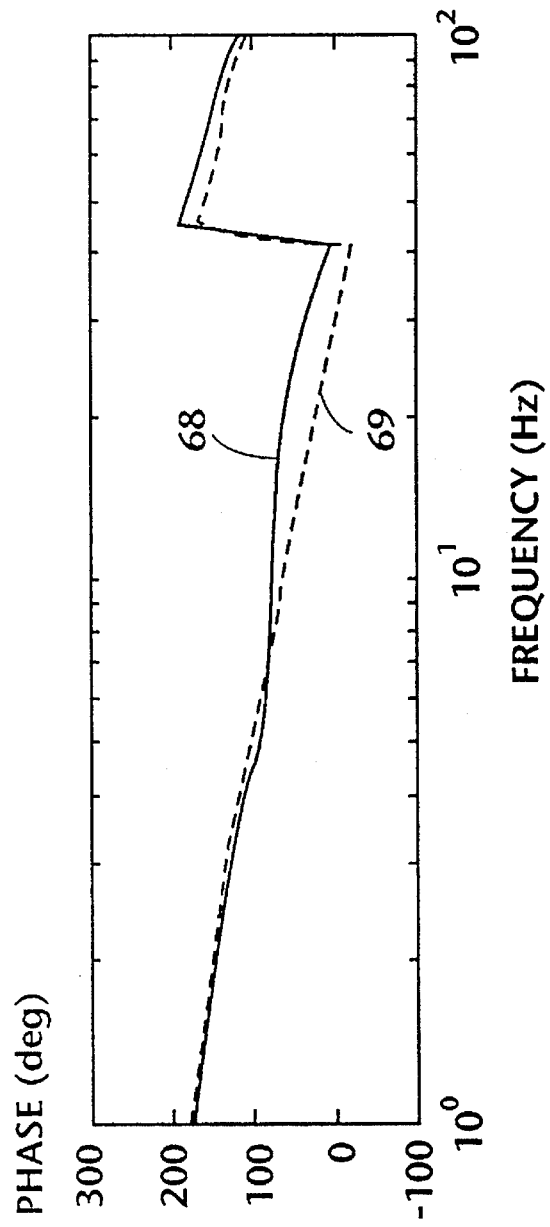

Still further, FIGS. 6A and 6B each is a graph showing a gain and frequency response from the desired motor speed R up to the equivalent disturbance D. Solid lines 66 and 68 indicate the case where the compensation is implemented, while broken lines 67 and 69 indicate the case where any compensation is not carried out. It is understood that implementing the compensation is able to suppress the equivalent disturbance.

It is thus apparent that the control method of the present invention is able to suppress the equivalent disturbance which involves the environment changes and aging.

FIG. 7 is a diagram showing test results of the motor speed responses. In FIG. 7, a curve 70 indicates the results of the motor speed response in the case where the above mentioned compensation is not performed at a room temperature. A curve 71 indicates the test results of the motor speed response if the compensation is implemented at a high temperature. On the other hand, a curve 72 indicates test results of the motor speed response wherein the compensation is not carried out at a high temperature. Further, FIG. 7 illustrates that a speed overshoot can be suppressed when the compensation is implemented as compared with the case where no compensation is carried out.

The printer head carriage speed control according to the present invention, is able to suppress the effects otherwise caused by the environmental changes or aging. Further, the use of the compensator can suppress the variations of characteristics induced by ambient temperature changes.

The control of the present invention is very simple and hence, if the control is realized using an arithmetic processor such as CPU, it is sufficient if equation (15) is programed. That is, adding few program steps to a conventional control program is sufficient. Thus, the present invention incurs no problems of increasing manufacturing costs.

Further, equation (15) can be determined analytically and thus, there is no need to repeatedly conduct experiments. The control implements the compensation in a feedback manner, so that unexpected disturbance can be compensated.

As mentioned above, when the control of the present invention is applied to a serial printer, it is possible to realize a product which is free from printing degradation induced by the environmental changes and/or aging.

It will be understood that the above disclosure is representative of only two possible embodiments and that various modifications can be made without departing from the concept of the invention.

What is claimed is:

1. A method of controlling a transportation velocity of a printhead carriage of a serial printer, said printhead carriage being driven by a motor by way of a timing belt, said method comprising the steps of:

(a) receiving at an equivalent disturbance compensator signals corresponding to a motor speed, and a current applied to said motor;

(b) generating at said equivalent disturbance compensator an equivalent disturbance compensating signal based on a characteristic equation, wherein said motor speed and said current applied to said motor are variables of said characteristic equation;

(c) generating a motor speed compensating signal based on a difference between said motor speed and a desired motor speed; and (d) producing a current to be applied to said motor in accordance with said motor speed compensating signal and said equivalent disturbance compensating signal.

2. A method of controlling a transportation velocity of a printhead carriage of a serial printer as set forth in claim 1, wherein said signals corresponding to the motor speed and the current to be applied to the motor are time sampled at said equivalent disturbance compensator and wherein said characteristic equation is discretized.

3. A method of controlling a transportation velocity of a printhead carriage of a serial printer, as set forth in claim 2, wherein a low pass filter is applied to a solution signal based on said discretized characteristic equation to produce said equivalent disturbance compensating signal.

4. A velocity control apparatus for a printhead cartridge comprising:

(a) a printhead cartridge motor;

(b) a sensor for measuring a speed of said motor;

(c) a motor controller for varying said motor speed in response to a control input which is a sum of a first and a second signal;

(d) a motor speed compensator for producing said first signal in accordance with a difference between said motor speed and a desired motor speed; and (e) an equivalent disturbance compensator for producing said second signal in accordance with said motor speed and said control input.

5. A method for controlling a printhead cartridge velocity comprising the steps of:

(a) driving said printhead cartridge with a motor;

(b) measuring a speed of said motor;

(c) varying said motor speed in response to a control input which is a sum of a first and a second signal;

(d) generating said first signal in accordance with a difference between said motor speed and a desired motor speed; and (e) generating said second signal in accordance with said motor speed and said control input.

* * * * *